UNITED STATES PATENT OFFICE.

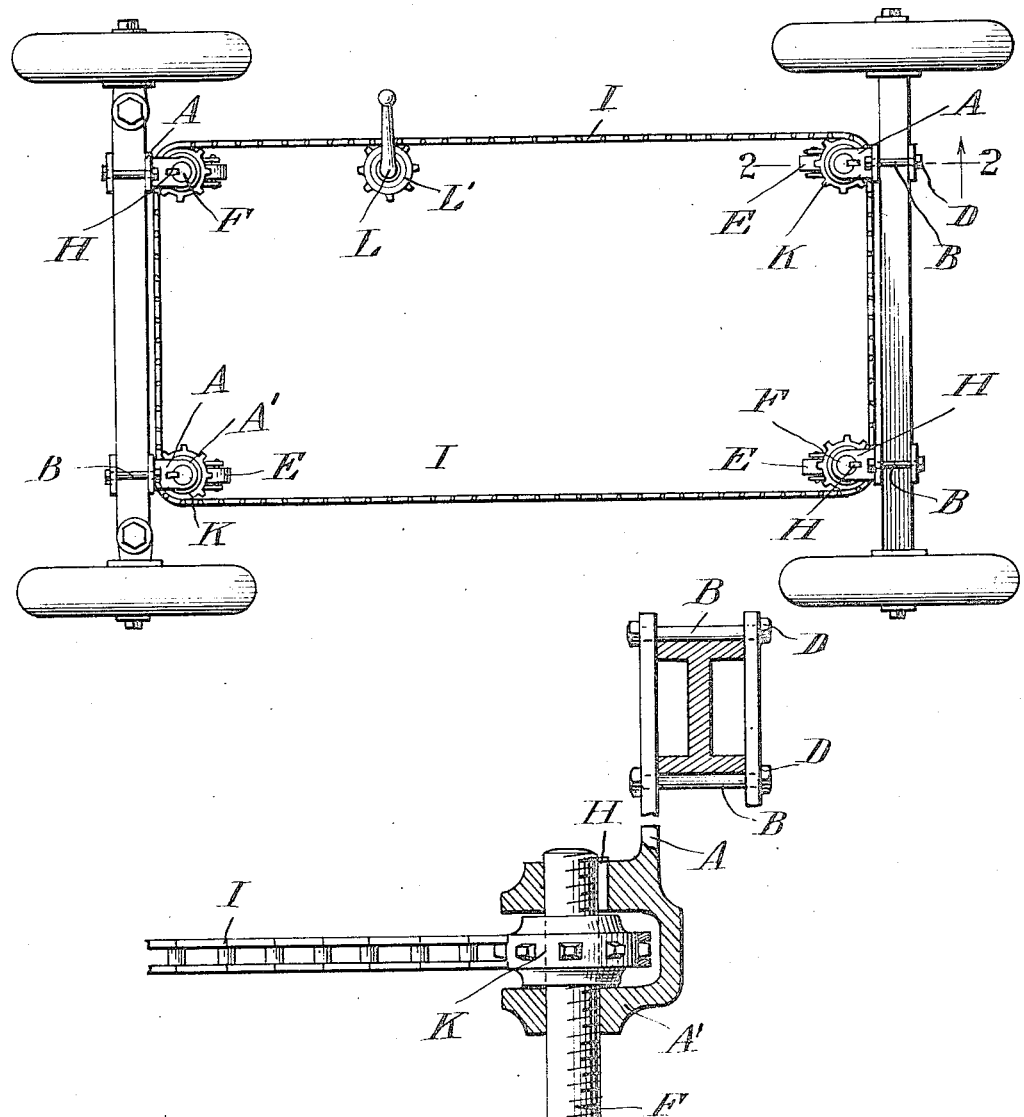

EMELIA F. KANDLBINDER, OF SPRINGFIELD, ILLINOIS.

AUTOMOBILE-LIFTING-JACK APPARATUS.

1,225,644.      Specification of Letters Patent.      Patented May 8, 1917.

Application filed August 17, 1916. Serial No. 115,550.

*To all whom it may concern:*

Be it known that I, EMELIA F. KANDLBINDER, a citizen of the United States, residing at Springfield, in the county of Sangamon and State of Illinois, have invented certain new and useful Improvements in Automobile-Lifting-Jack Apparatus; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in automobile lifting jack apparatus, designed to be attached to the axles of an automobile and affording means whereby, when the machine is at rest, the wheels may be relieved of the weight of the machine.

The invention consists of a simple device of this nature having various details of construction and combinations and arrangements of parts which will be hereinafter fully described, shown in the accompanying drawings and then specifically defined in the appended claim.

My invention is illustrated in the accompanying drawings, in which:

Figure 1 is a top plan view of the invention, and

Fig. 2 is a sectional view taken on line 2—2 of Fig. 1.

Reference now being had to the details of the drawings by letter, A, A designate hangers which are held to the axles of an automobile by means of the threaded bolts B which pass through apertures in said hangers and upon which bolts nuts D are mounted. Each hanger has a yoke A' in which a threaded shaft F is mounted in registering openings in the arms of the yoke and held from rotation by means of a key H. It will be noted that there are four of said hangers mounted two upon each axle, and upon each threaded shaft F is a sprocket wheel K, interiorly threaded to engage the threads of said shaft F. A sprocket chain I is fastened about the several sprocket wheels, and L is a crank shaft journaled in suitable bearings and has fixed thereto a sprocket wheel L' which is in mesh with the sprocket chain I.

Each rod F is provided with a caster wheel E which is fastened thereto and affords convenient means for supporting the screw and the weight carried thereby. If preferred, however, the caster wheel may be dispensed with.

In operation, the apparatus is fastened to the axle of a vehicle and is adapted to be permanently held thereon. The operator by turning the crank shaft L, which should be located so that it could be conveniently reached by the operator while sitting in the car or standing on the ground adjacent thereto, may cause the several sprocket wheels in the hangers to rotate and, as the screws are held stationary, the sprocket wheels will bear against the yokes of the hangers and cause the same to be elevated and with them the axles of the vehicle, thus freeing the wheels and tires from the weight of the car. A reverse movement of the crank shaft will lower the vehicle so that its weight will rest upon the tires, the screws being raised from contact with the ground or roadway.

What I claim to be new is:—

An automobile jack comprising hangers and means for clamping the same against the adjacent edges of the forward and rear axles of a vehicle, each hanger having a yoke which is recessed, the opposite walls of the recess provided with registering apertures, a threaded shaft mounted in said apertures and a key for holding the shaft from rotation, a caster wheel secured to the bottom of each shaft, a sprocket wheel with a central opening having interior threads, said wheel journaled upon the threaded shaft within the recess of said yoke, a sprocket chain passing about the several sprocket wheels, and a driving sprocket wheel in engagement with the sprocket chain and having a driving handle, as set forth.

In testimony whereof I hereunto affix my signature in presence of two witnesses.

EMELIA F. KANDLBINDER.

Witnesses:
WILLIAM E. FAIN,
L. E. STONE.